J. H. BOYLE.
Vegetable-Cutter.
No. 203,883. Patented May 21, 1878.
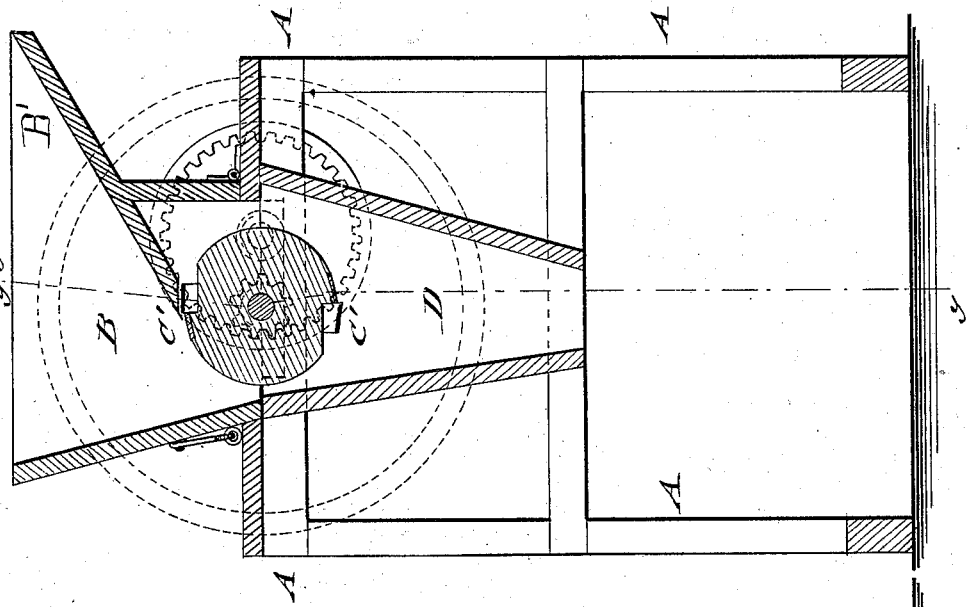
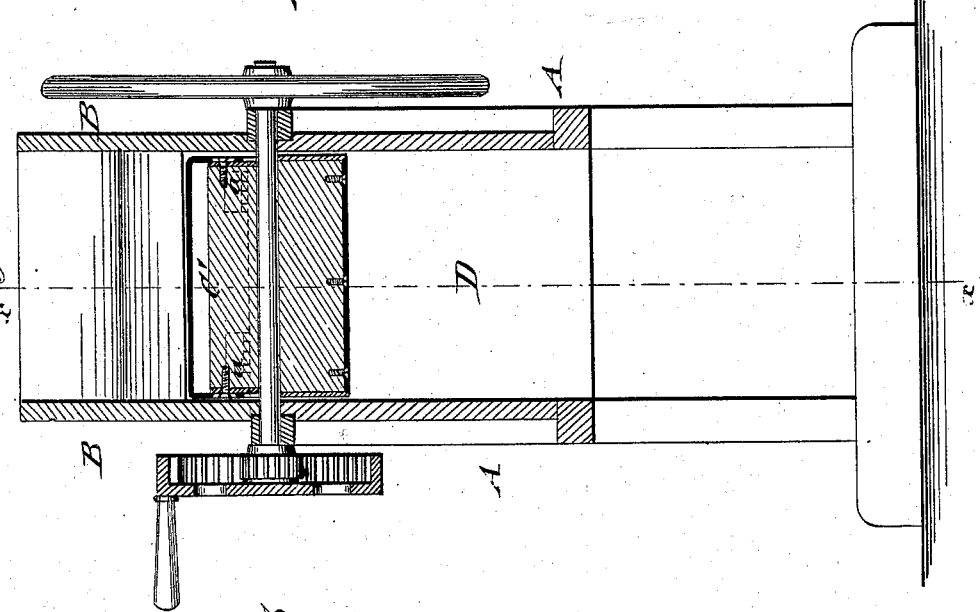
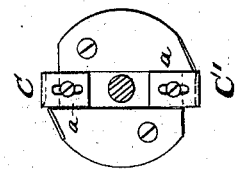
WITNESSES:
C. Neveux
C. Sedgwick
INVENTOR:
J. H. Boyle
BY Munn & Co
ATTORNEYS.

UNITED STATES PATENT OFFICE.

JEREMIAH H. BOYLE, OF DELHI MILLS, MICHIGAN.

IMPROVEMENT IN VEGETABLE-CUTTERS.

Specification forming part of Letters Patent No. 203,883, dated May 21, 1878; application filed February 26, 1878.

*To all whom it may concern:*

Be it known that I, JEREMIAH H. BOYLE, of Delhi Mills, in the county of Washtenaw and State of Michigan, have invented a new and Improved Vegetable-Cutter, of which the following is a specification:

In the accompanying drawing, Figure 1 represents a vertical longitudinal section on line $x\,x$, Fig. 2. Fig. 2 is a vertical transverse section on line $y\,y$, Fig. 1, of my improved vegetable-cutter; and Fig. 3 is a side view of the knife-cylinder, showing method of adjusting knives.

Similar letters of reference indicate corresponding parts.

This invention is designed to furnish for farmers, and for other agricultural and domestic purposes, an improved machine for cutting roots and vegetables in a rapid and easy manner, to be used for cooking or feeding purposes, and supply thereby a feed that is more easily masticated by the stock.

The invention will first be described in connection with the drawing, and then pointed out in the claim.

Referring to the drawing, A represents the supporting-frame of my improved vegetable-cutter, on which is supported, at the top part, a hopper, B, that is provided at one side with an inclined feed-board, B′, that is extended downward so as to be nearly tangential to the cutting-cylinder C, for the purpose of feeding turnips, roots, or other vegetables to the action of the cutting-knives on the cylinder C. The cylinder C revolves in bearings of the supporting-frame, being set in motion by a crank-wheel and suitable gearing at one side of its shaft, and by a fly-wheel at the opposite end.

On the revolving cylinder are arranged two or more cutting-knives, C′, that are guided by their rectangularly bent and slotted end pieces in grooves at the ends of the cylinder, and secured nearer to or farther from the circumference of the cylinder by set-screws $a$.

The knives may be adjusted on the cylinder as required, so as to cut up the roots and vegetables to any thickness. The top hopper is hinged to the frame A at one side, and locked by hook and eye or other fastening devices at the opposite side, so as to be opened for admitting the convenient cleaning of the cutting-knives or the detaching of the same for sharpening and replacing.

The cut-off parts or slices of the vegetables are conducted through a bottom hopper, D, to a suitable receptacle below, and thus by the machine a large number of turnips or other vegetables can be cut for food in a rapid manner and with great facility.

The simplicity of its construction admits of its being manufactured and furnished at a comparatively low price, so as to be specially adapted for agricultural purposes.

Having thus described my invention, I claim as new and desire to secure by Letters Patent—

The combination, with hopper B, of a cylinder, C, having knives C′, guided by rectangularly bent and slotted end pieces in grooves at the end of the cylinder, as and for the purpose specified.

JEREMIAH H. BOYLE.

Witnesses:
    ROBERT MCCOLL,
    RICHD. HELSON.